United States Patent [19]

Osako

[11] Patent Number: 5,225,917
[45] Date of Patent: Jul. 6, 1993

[54] RETRACTABLE PLATEN FOR DOCUMENT READING DEVICES

[75] Inventor: Hideyuki Osako, Tokyo, Japan

[73] Assignee: Ricoh Company, Ltd., Tokyo, Japan

[21] Appl. No.: 668,784

[22] Filed: Mar. 13, 1991

[30] Foreign Application Priority Data

Mar. 14, 1990 [JP] Japan .................................. 2-61273

[51] Int. Cl.[5] .............................................. H04N 1/04
[52] U.S. Cl. .................................. 358/498; 355/230; 355/231; 355/234
[58] Field of Search .............. 358/474, 486, 487, 488, 358/494, 496, 497, 498, 473; 355/308, 309, 233, 234, 210, 211, 213, 230, 231

[56] References Cited

U.S. PATENT DOCUMENTS 4,417,260 11/1983 Kawai et al. ....................... 358/494
4,610,530 9/1986 Lehmbeck et al. ................. 355/309
4,910,612 3/1990 Yamazaki et al. .................. 358/498

FOREIGN PATENT DOCUMENTS 0210766 11/1984 Japan .................................. 358/498

Primary Examiner—Edward L. Coles, Sr.
Assistant Examiner—Jerome Grant, II
Attorney, Agent, or Firm—Oblon, Spivak, McClelland, Maier & Neustadt

[57] ABSTRACT

A document reading device for sheet-through type image forming equipment. The device has a document laying member located in a reading position and implemented as a glass platen. The glass platen is protected from damage when a document pressing member in the form of a back-up roller is inadvertently let fall or hits against the glass platen.

7 Claims, 6 Drawing Sheets

RETRACTABLE PLATEN FOR DOCUMENT READING DEVICES

BACKGROUND OF THE INVENTION

The present invention relates to a document reading device for sheet-through type image forming equipment and, more particularly, to a document reading device having a document laying member located at a predetermined reading position and implemented as a glass platen and protecting the glass platen against damage when a document pressing member in the form of a back-up roller is inadvertently let to fall or hits against the glass platen.

An electronic copier, facsimile transceiver, laser printer or similar image forming equipment has a document reading device which is often provided with a sheet-through configuration. Specifically, a sheet-through type document reading device illuminates a document by stationary lamps while transporting the document and reads a reflection from the document by a photoconductive element, CCD array or similar reading device via stationary optics. This type of document reading device is disclosed in Japanese Utility Model Laid-Open Publication No. 126512/1988 and Japanese Patent Laid-Open Publication No. 157670/1989 by way of example. Specifically, a document transported by a transporting member in the form of a roller is brought to a stop at a reading position on a glass platen. While the rear of the document is pressed against the glass platen by a document pressing member implemented as a back-up roller, optics disposed below the glass platen reads an image printed on the document. Generally, the back-up roller is movable away from the glass platen by a substantial angle, i.e., it is journalled to free ends of arms which are in turn rotatably mounted on a shaft. Hence, when the surface of the back-up roller or the upper surface of the glass platen is contaminated, the arms may be rotated about the shaft to move the back-up roller away from the glass platen. Then, the back-up roller or the glass platen is readily accessible for maintenance work such as cleaning or replacement. However, it is likely that the back-up roller moved away from the glass platen is inadvertently let to fall onto the glass platen during or after maintenance to break the glass platen and/or to damage the back-up roller. Further, when the document being transported through the document reading device is relatively thick, the back-up roller drops onto the glass platen over a distance corresponding to the thickness of the document as soon as the trailing edge of the document leaves the back-up roller. This is also apt to crack the glass platen.

SUMMARY OF THE INVENTION

It is therefore an object of the present invention to provide a document reading device for image forming equipment which protects a glass platen from breakage or cracking even when a back-up roller or similar document pressing member drops onto the glass platen.

It is another object of the present invention to provide a generally improved document reading device for image forming equipment.

A document reading device for image forming equipment of the present invention comprises a document laying member for laying a document being transported along a transport path on the upper surface thereof at a predetermined reading position, a document pressing member for pressing the document by gravity at the reading position, a rotatable member supporting the document pressing member and rotatable about a shaft to move the document pressing member away from the document laying member, a positioning member having a positioning surface for positioning the upper surface of the document laying member in a reference position, and a biasing member for constantly biasing the document laying member in such a direction that the upper surface of the document laying member abuts against the positioning surface of the positioning member.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENTS

Figure 1:
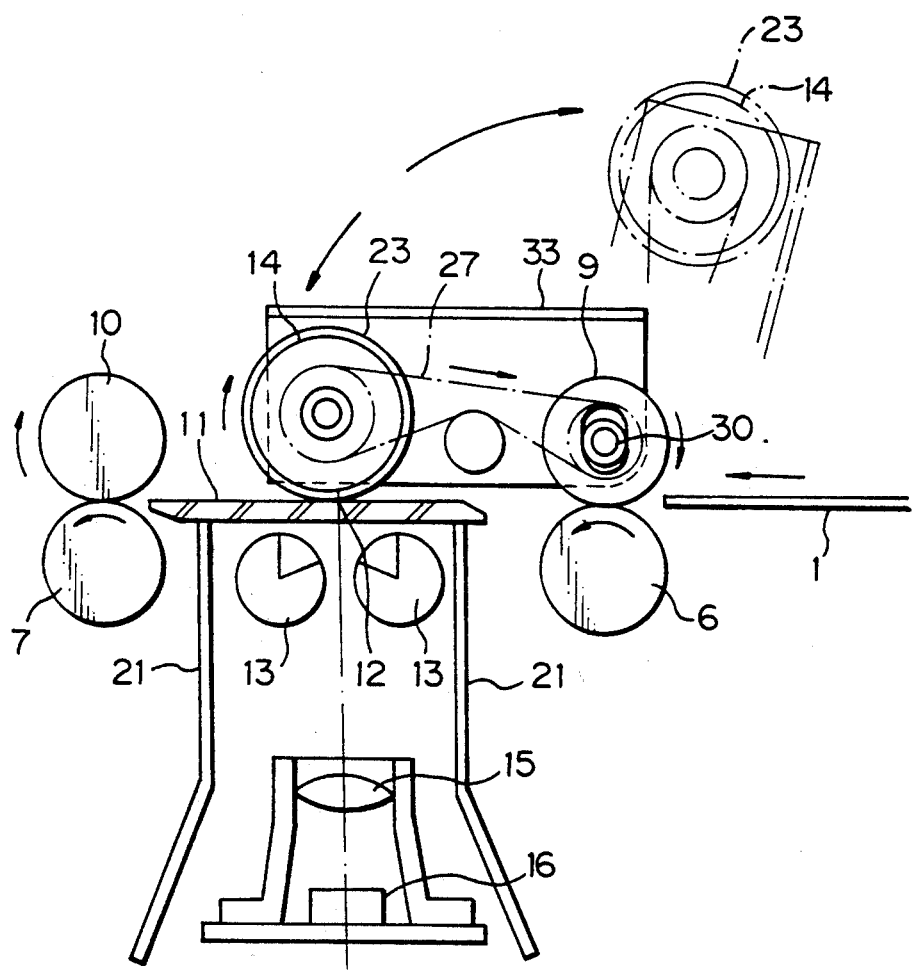
FIG. 1 is a sectional side elevation showing a conventional document reading device.

To better understand the present invention, a brief reference will be made to a prior art document reading device of the type disclosed in Japanese Patent Laid-Open Publication No. 157670/1989, shown in FIG. 1. As shown, the device has a glass platen 11 located on a path for transporting a document 1. This transport path includes a predetermined reading position 12. The glass platen 11 supports and guides the document 1 with the upper surface thereof over a given range which includes the reading position 12. Transport rollers 6 and 7 are located on the transport path upstream and downstream of the glass platen, respectively. Press rollers 9 and 10 are held in pressing contact with, respectively, the transport rollers 6 and 7 with the intermediary of the transport path. A back-up roller 14 is disposed slightly above the glass platen 11 to cause the document 1 to contact the glass platen 11 at the reading position 12. The gap between the back-up roller 14 and the glass platen 11 is defined by guide rollers 23 which are mounted on opposite ends of the roller 14 coaxially with the latter. Specifically, the guide rollers 23 each have a diameter slightly greater than the diameter of back-up roller 14 and rest on the upper surface of the glass platen 11. Arms 33 are rotatable about a shaft 30 on which the press roller 9 is mounted. The back-up roller 14 is journalled to the free ends of the arms 33. The back-up roller 14 and press roller 9 are rotated at the same peripheral speed by a timing belt 27. Lamps 13 are disposed below the glass platen 11 for illuminating the document 1 at the reading position 12. A lens 15 is located on an optical path along which a reflection from the document 1 is propagated. The lens 15 focuses the reflection onto a CCD array or similar reading device 16. The CCD array 16 reads the document 1 by self-scanning in a direction perpendicular to the sheet surface of FIG. 1, i.e., in the main scanning direction.

Generally, the glass platen 11, lamps 13, lens 15 and CCD array 16 are supported by a support member 21 which plays the role of a dust cover at the same time. The support member 21 is affixed to the framework of the equipment. When the surface of the back-up roller 14 or the upper surface of the glass platen 11 is contaminated, the back-up roller 14 is rotated more than 90 degrees about the shaft 30 to a position indicated by a dash-and-dot line in the figure. In this condition, the roller 14 or the glass platen is accessible for cleaning or replacement. A problem with such a configuration is that when the back-up roller 14 is inadvertently let to fall from such a raised position onto the glass platen 11, it is apt to break the glass platen 11 since the underside of the glass platen 11 is supported by the support member 21 which is rigid on the framework. Another problem is that in the case of a relatively thick document the back-up roller 14 is raised away from the glass platen 11 by the thickness of the document and then let to fall when the trailing edge of the document leaves the roller 14, also tending to crack or break the glass platen 11.

Preferred embodiments of the document reading device in accordance with the present invention will be described hereinafter. In the embodiments, component parts and structural elements having the same functions as those of the conventional device shown in FIG. 1 are designated by the same reference numerals for easy comparison.

Figure 2:
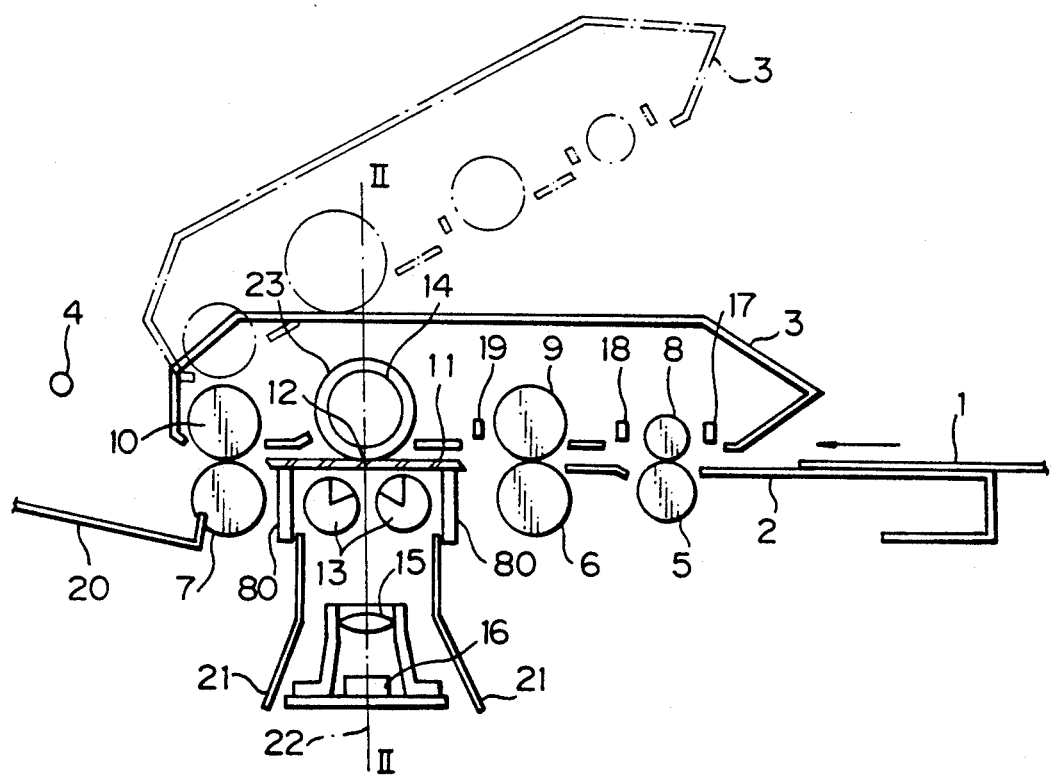
FIG. 2 is a sectional side elevation showing a document reading device embodying the present invention.
Figure 3:
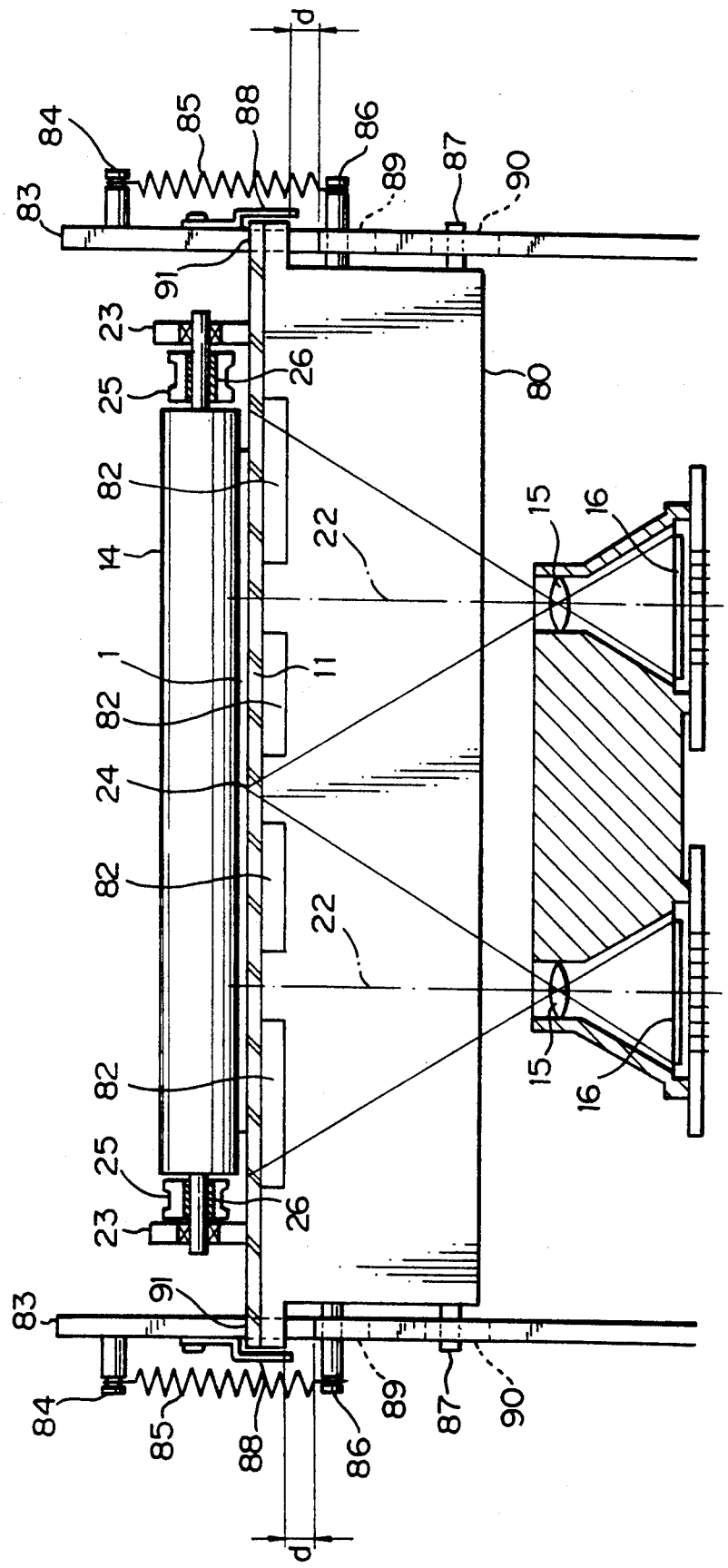
FIG. 3 is a section along line III—III of FIG. 2.

Referring to FIGS. 2 and 3, a document reading device embodying the present invention has an upper unit case 3 which rests on a document table 2 and is rotatable up and down about a shaft 4. Transport rollers 5, 6 and 7 are arranged on the document table 2 and driven by a motor and associated drive mechanism, not shown. Press rollers 8, 9 and 10 are held in pressing contact with the transport rollers 5, 6 and 7, respectively, and are rotatably supported by the upper unit case 3. A glass platen 11 is disposed between the transport rollers 6 and 7 and is substantially flush with the document table 2 to serve as transparent document laying means. A reading position 12 is defined on the glass platen 11. An illuminating device in the form of lamps 13 illuminates a document 1 located at the reading position 12. A back-up roller 14 is disposed at the reading position 12 to face the glass platen 11 and is spaced apart from the glass platen 11 by a small gap. This gap is selected to be 0.1 millimeter to 0.2 millimeter in consideration of the fact that ordinary sheet documents are about 50 microns to 100 microns thick. The back-up roller 14 is supported by the upper unit case 3 and driven in a rotary motion.

Figure 4:
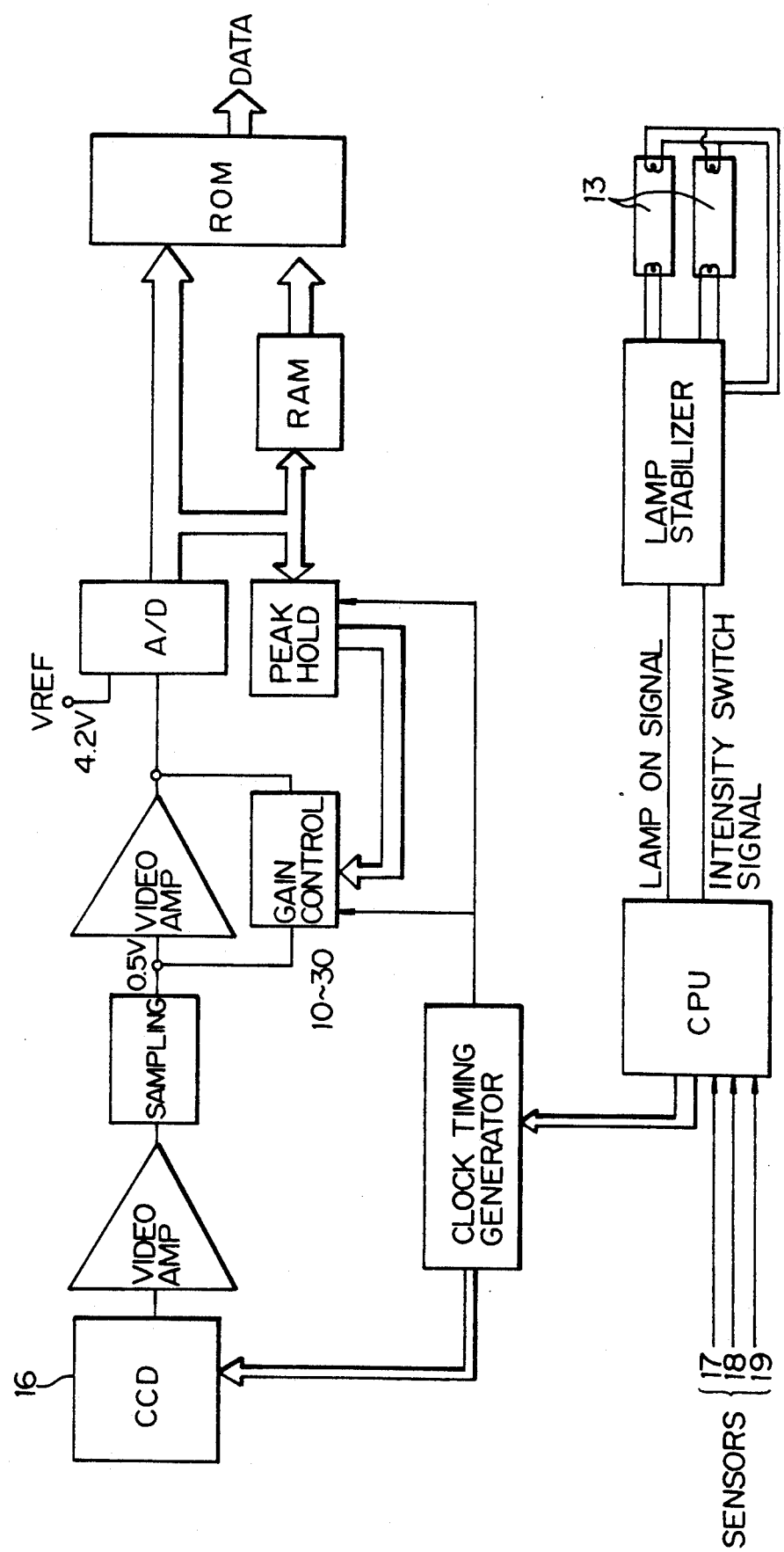
FIG. 4 is a block diagram schematically showing a specific construction of a shading correction circuit.

As the lamps 13 illuminate the document 1, a reflection from the document 1 is focused by a lens 15 onto a CCD array or similar reading device 16. As soon as a first sensor 17 mounted on the upper unit case 3 senses the insertion of the document 1, the transport rollers 5, 6 and 7 and the back-up roller 14 start rotating and the lamps 13 are turned on. When a second sensor 18 senses the leading edge of the document 1 being transported, the transport speed is changed in matching relation to a desired magnification change ratio. As the document 1 is driven by the transport roller 6, a register sensor 19 senses it. Then, a reflection from the back-up roller 14 is read by the CCD array 16 via the lens 15. The surface of the back-up roller 14 is painted white to have a reflection density of about 0.03 to 0.08 (reflectance of 93 percent to 83 percent). The reflection data so read by the CCD array 16 is converted to digital data and then written to a shading RAM as shading correction data. This operation is repeated until the leading edge of the document 1 arrives at a position just short of the reading or exposing position 12. During this period of time, the data written to the RAM and the digital output are constantly compared and, every time a digital output greater than the stored data appears, the RAM is updated. This is successful in freeing the exposure from the influence of an irregular intensity distribution which may occur in the event of the turn-on of the lamps 13. Even when the surface of the pack-up roller 14 is partly contaminated, only if it has some white area, a digital output associated with such an area is written to the RAM. Hence, the influence of the contamination of the back-up roller 14 is substantially eliminated. FIG. 4 is a block diagram schematically showing a specific construction of a shading correction circuit.

While the document 1 is transported on and along the glass platen 11 by way of the gap between the glass platen 11 and the back-up roller 14, the lamps 13 illuminate it at the reading or scanning position 12. A reflection from the document 1 is focused by the lens 15 onto the CCD array 16 and read thereby in a reduced scale. The resulted image data is corrected by the shading correction data to compensate for the irregular intensity distribution of the lamps 13, the reduction of intensity due to the $COS^4$ rule of the lens 15, the irregular sensitivity distribution of the CCD array 16, etc. The document 1 having been fully scanned is driven out to a tray 20 by the transport roller 7 and press roller 10. The upper surface of the glass platen 11 and the surface of the document table 2 are positioned on the line on which the transport rollers 5, 6 and 7 and the press rollers 8, 9 and 10 contact. The upper unit case 3 is rotatable a predetermined angle upward about the shaft 4 to expose the document table and glass platen 11 to the outside. In such a condition, various kinds of maintenance work such as cleaning the rollers, guides, sensors and glass platen, removing a jammed document, and replacing the lamps 13 can be performed with ease. A cover 21 prevents dust and other impurities from reaching the lamps 13, lens 15 and CCD array 16.

FIG. 3 is a section in a plane which passes the optical axis 22 of the lens 15. As shown in the figure, two sets of optics each including the lens 15 are arranged at spaced locations in the main scanning direction. The CCD arrays 16 each being included in a respective one of the two optics read the document 1 independently of each other. In the configuration shown in FIG. 3, the lenses 15 and associated CCD arrays 16 are arranged along two different optical axes 22. The document 1 is transported between the glass platen 11 and the back-up roller 14. Should the back-up roller 14 contact the glass platen 11, it would scratch the glass platen 11 since it is driven in a rotary motion. In light of this, the back-up roller 14 is so supported as to be spaced apart by a minimum necessary distance from the glass platen. Specifically, guide rollers 23 are rotatably mounted on opposite ends of a shaft that supports the back-up roller 14. The guide rollers 23 each have a diameter which is greater than the diameter of the back-up roller 14 by an amount corresponding to the gap between the back-up roller 14 and the glass platen 11. Although the document 1 may have a curl or a fold, the glass platen 11 and back-up roller 14 urge it against the glass platen 11 in a flat position. This constantly holds the document at a predetermined distance from the lenses 15. Since the document 1 is prevented from lifting away from the glass platen 11, the border 24 where the two optics adjoin at the illuminating position is maintained with accuracy. As a result, the two optics read the document 1 with the optimal focus and without missing any image at the border 24. Pulleys 25, for example, are mounted on the back-up roller 14 by one-way clutches 26.

The construction described so far is essentially the same as the conventional construction shown in FIG. 1. Characteristics features of the present invention for achieving the previously stated objective are as follows. In the illustrative embodiment, the glass platen 11 is not supported by a support member which is affixed to a framework and bifunctions as a dust cover. Instead, the glass platen 11 of the embodiment is laid on support members 80 each being constantly biased upward by springs 85, so that the upper surface of the glass platen 11 is resiliently pressed against positioning faces 91 of frames 83.

Specifically, as shown in FIG. 3, the frames 83 are located at opposite ends of the reading device with respect to the right-and-left direction, i.e. the main scanning direction. The upper surface of the glass platen 11 abuts against the positioning faces 91 of the frames 83 to be located at a predetermined reference position. The glass platen 11 is laid on the upper ends of the support members 80 which are positioned in spaced locations in the intended direction of document transport and extend in the main scanning direction. Notches 82 are formed in the upper edge of each support member 80 and at spaced locations in the main scanning direction so as to radiate heat which the lamps 13 generate. Two pins 86 and two pins 87 are studded on opposite ends of each support member 80 while guide slots 89 and 90 are formed through each frame 83. The pins 86 and 87 are slidably received in the guide slots 89 and 90, respectively. Hence, the support members 80 each is movable over a range corresponding to the distance d, FIG. 3, between the lower edges of the lugs extending out from opposite ends of the support member 80 and the upper ends of notches of the frames 83, while remaining in a vertical position. A pin 84 is studded on each frame 83 above the reference position. A tension spring 85 is anchored at one end to the pin 84 of each frame 83 and at the other end to the pin 86 of the associated support member 80. The total biasing force exerted by the springs 85 on the support member 80 is selected to be greater than a usual pressing force exerted by the back-up roller 14 on the glass platen 11 during image reading and smaller than a given or predetermined pressing force greater than the above-mentioned usual pressing force.

In the above configuration, the glass platen 11 is constantly urged against the positioning faces 91 of the frames 83 via the support members 80 by the springs 85. While the glass platen 11 is held in such a reference position, a reflection from a document 1 is focused onto the CCD arrays 16 accurately. Assume that an excessive force has acted on the glass platen 11 such as when the back-up roller 14 is let to fall onto the glass platen. Then, the tension springs 85 are extended to cause the glass platen 11 to retract downward. As a result, the impact is absorbed to safeguard the glass platen 11 against damage. In addition, when the document 1 jams the transport path in an accordion configuration, the glass platen 11 is retracted in such a manner as to broaden the space around the reading portion. This prevents or substantially prevents not only the document 1 but also the back-up roller 14 and glass platen 11 from being damaged. Stops 88 are provided on the frames 83 adjacent to opposite ends of the glass platen 11 with respect to the main scanning direction, whereby the movement of the glass platen 11 is restricted in the main scanning direction.

Figure 5:
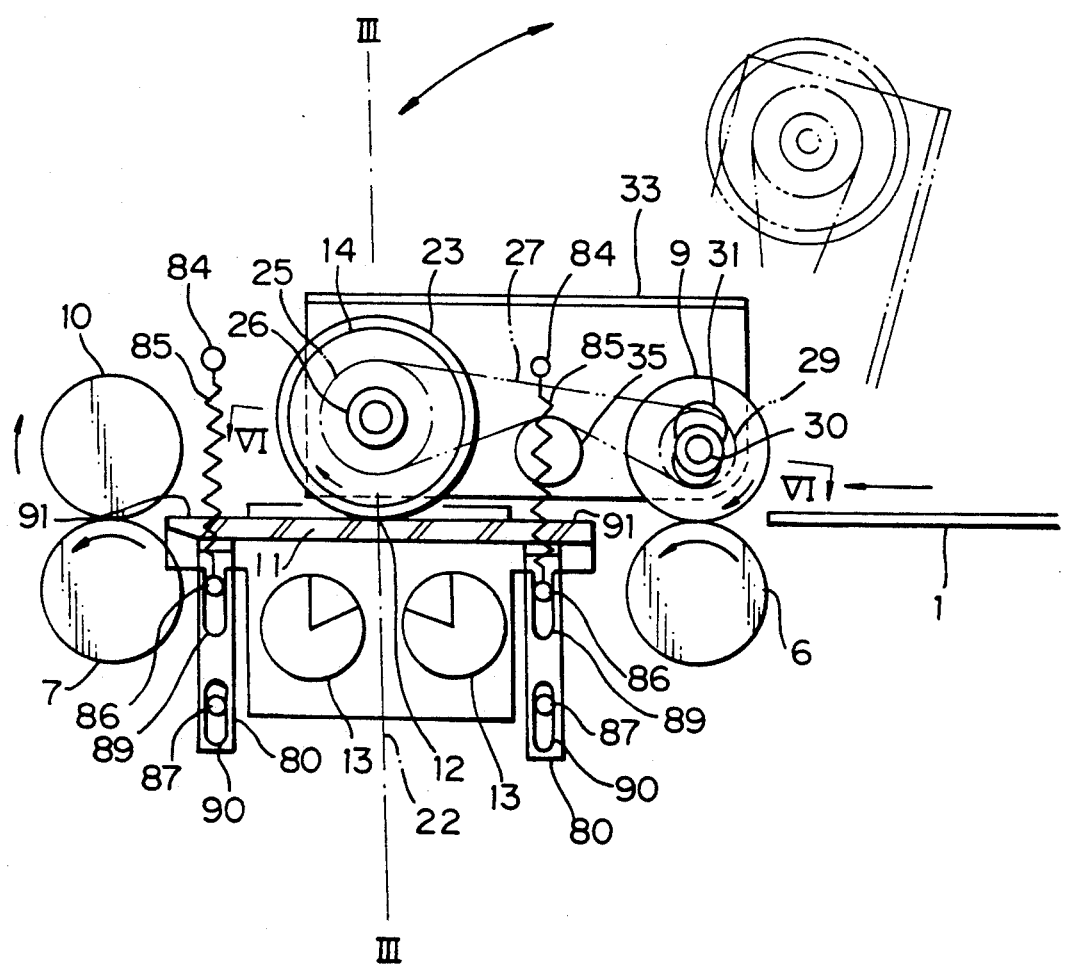
FIG. 5 is a sectional side elevation showing an alternative embodiment of the present invention.
Figure 6:
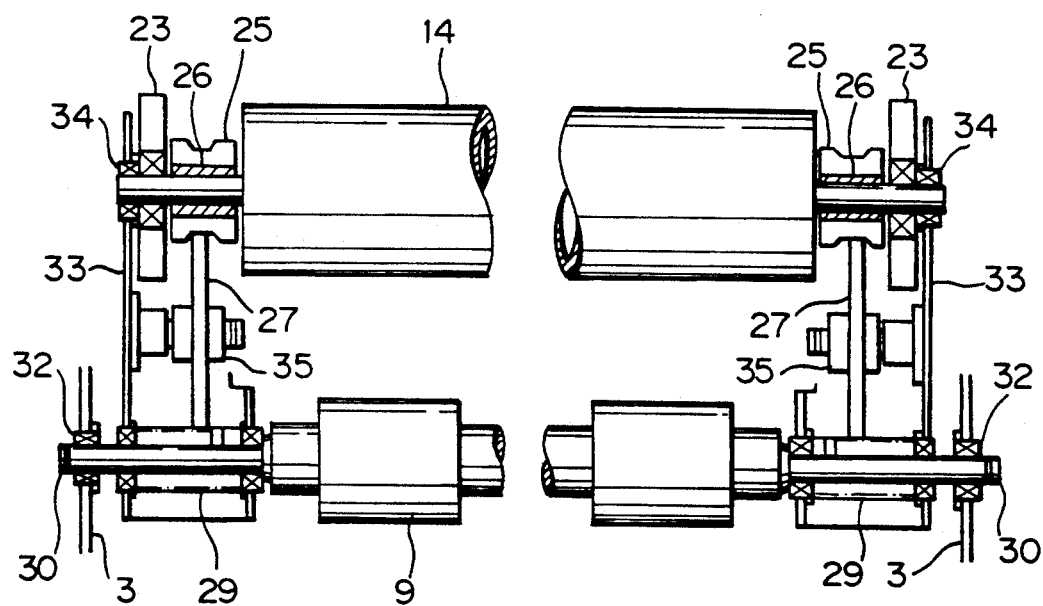
FIG. 6 is a section along line VI—VI of FIG. 5.

Referring to FIGS. 5 and 6, an alternative embodiment of the present invention is shown which is applied to the prior art document reading device shown in FIG. 1. It is to be noted that a vertical section along line III—III of FIG. 5 is exactly the same as the section of FIG. 3 and will be used for the following description. The lens 15, CCD array and dust cover 21 are provided in the same positions as in FIG. 2, although not shown in the figure.

In FIGS. 5 and 6, the pulleys 25 mounted on the shaft of the back-up roller 14 by the one-way clutches 26 each are connected to a drive pulley 29 by a timing belt 27. The drive pulley 29 is affixed to a shaft 30 on which the upstream press roller 9 is mounted. The press roller 9 is pressed against the transport roller 6 to be driven by the latter. The rotation of the press roller 9 is transmitted to the back-up roller 14 by the timing belt 27 and pulley 25. The press roller shaft 30 is parallel to the axis of rotation of the back-up roller 14 and received in elongate slots 31 which are formed through opposite side walls of the upper unit case 3. Arms 33 are rotatably supported by bearings 34 on the shaft 30. The shaft of the back-up roller 14 is rotatably supported by the arms 33 by the bearings 34. The press roller 9 is movable up and down in matching relation to the thickness of the document 1, so that the document 1 may be pressed by the rollers 9 and 6 in an optimal condition. The belt 27 for driving the back-up roller 14 is provided with an adequate tension by a tension adjusting pulley 35. In this construction, the back-up roller 14 is rotated at a speed substantially synchronous with the transport speed of the document 1.

Supported by the arms 33, the back-up roller 14 rotates about the shaft 30 when the document 1 has a thickness greater than the gap which is the difference in diameter between the rollers 14 and 23. Therefore, such a document 1 is prevented from being pressed against the glass platen 11 by an excessive force. The back-up roller 14 urges the document 1 against the glass platen 1 by gravity and thereby prevents it from lifting. Even when the document 1 has a substantial thickness, the back-up roller 14 assumes the same position as with a document as thin as, for example, 0.1 millimeter to 0.2 millimeter in the event when shading data is collected. Hence, the density levels of a read image remain the same with no regard to the thickness of the document. When the document 1 is relatively thick, the back-up roller 14 presses itself against the document to play the role of transporting means since it is rotated substantially in synchronism with the rotation of the transport roller 6.

The glass platen 11 is located in the predetermined position in the manner described previously with reference to FIG. 3.

The illustrative embodiments have been shown and described in relation to a document pressing member implemented as a back-up roller which bifunctions as a shading reference member. However, the embodiments are not limited to the shading reference member and are practical even with a flat document pressing member in place of the back-up roller.

In summary, it will be seen that the present invention allows a glass platen to be readily retracted downward when an excessive force acts on the glass platen, e.g., when a document pressing member is let to fall onto the glass platen or when a document jams a document reading section, despite a simple construction thereof. The glass platen, therefore, is free from or substantially free from damage ascribable to such an unexpected force.

Various modifications will become possible for those skilled in the art after receiving the teachings of the present disclosure without departing from the scope thereof.

What is claimed is:

1. A document reading device for image forming equipment, comprising:
    document laying means for laying a document being transported along a transport path on an upper surface thereof at a predetermined reading position;
    document pressing means for pressing the document by gravity at said reading position;
    a rotatable member supporting said document pressing means and rotatable about a shaft to move said document pressing means away from said document laying means;
    positioning means having a positioning surface for positioning said upper surface of said document laying means in a reference position; and
    biasing means for constantly biasing said document laying means in such a direction that said upper surface of said document laying means abuts against said positioning surface of said positioning means.

2. A device as claimed in claim 1, wherein said document laying means is retractable downward away from said reference position.

3. A device as claimed in claim 1, wherein said biasing means has a biasing force which is greater than a usual pressing force exerted by said document pressing means and smaller than a given pressing force greater than said usual pressing force.

4. A document reading device for image forming equipment, comprising:
    a transparent glass platen for laying a document being transported along a transport path on an upper surface thereof at a predetermined reading position;
    document pressing means for pressing the document by gravity at said reading position;
    a rotatable member supporting said document pressing means and rotatable about a shaft to move said document pressing means away from said transparent glass platen;
    positioning means having a positioning surface for positioning said upper surface of said transparent glass platen in a reference position; and
    biasing means for constantly biasing said transparent glass platen in such a direction that said upper surface of said transparent glass platen abuts against said positioning surface of said positioning means.

5. A device as claimed in claim 4, wherein said transparent glass platen is retractable downward away from said reference position.

6. A device as claimed in claim 4, wherein said biasing means has a biasing force which is greater than a usual pressing force exerted by said document pressing means.

7. A device as claimed in claim 4, wherein said document pressing means comprises a back-up roller for pressing the document located on said upper surface of said transparent glass platen.

* * * * *